(12) United States Patent
Zhang et al.

(10) Patent No.: US 11,762,776 B2
(45) Date of Patent: Sep. 19, 2023

(54) CACHE ACCESS METHOD AND ASSOCIATED GRAPH NEURAL NETWORK SYSTEM

(71) Applicant: T-HEAD (SHANGHAI) SEMICONDUCTOR CO., LTD., Shanghai Free Trade Area (CN)

(72) Inventors: Zhe Zhang, Shanghai Free Trade Area (CN); Shuangchen Li, Sunnyvale, CA (US); Hongzhong Zheng, Los Gatos, CA (US)

(73) Assignee: T-HEAD (SHANGHAI) SEMICONDUCTOR CO., LTD., Shanghai Free Trade (CN)

( * ) Notice: Subject to any disclaimer, the term of this patent is extended or adjusted under 35 U.S.C. 154(b) by 81 days.

(21) Appl. No.: 17/583,482

(22) Filed: Jan. 25, 2022

(65) Prior Publication Data
US 2023/0161707 A1   May 25, 2023

(30) Foreign Application Priority Data
Nov. 19, 2021   (CN) .......................... 202111373408.X

(51) Int. Cl.
*G06N 3/10*   (2006.01)
*G06F 16/901*   (2019.01)
*G06F 12/0875*   (2016.01)

(52) U.S. Cl.
CPC ...... *G06F 12/0875* (2013.01); *G06F 16/9017* (2019.01); *G06F 16/9024* (2019.01); *G06N 3/10* (2013.01); *G06F 2212/1021* (2013.01); *G06F 2212/1024* (2013.01)

(58) Field of Classification Search
CPC ............ G06F 12/0875; G06F 16/9017; G06F 16/9024; G06F 2212/1021; G06F 2212/1024; G06N 3/10
See application file for complete search history.

(56) References Cited

U.S. PATENT DOCUMENTS

| | | | |
|---|---|---|---|
| 10,936,713 B2 * | 3/2021 | Dehon | G06F 21/6209 |
| 11,573,899 B1 * | 2/2023 | Abali | G06F 12/0871 |
| 2005/0102474 A1 * | 5/2005 | Lakshmanamurthy | ...... G06F 9/3851 712/E9.055 |
| 2016/0188337 A1 * | 6/2016 | Lee | G06F 12/0862 712/207 |

(Continued)

*Primary Examiner* — Jorge A Casanova
(74) *Attorney, Agent, or Firm* — WPAT, P.C., INTELLECTUAL PROPERTY ATTORNEYS; Anthony King

(57) ABSTRACT

The present application discloses a cache access method and an associated graph neural network system. The graph neural network processor is used for performing computation upon a graph neural network. The graph neural network is stored in the memory in compressed sparse row format. The method includes: receiving an address corresponding to a node of the graph neural network and a type of the address; in response to the type is one of a first type or a second type, performing lookup by comparing the address with a tag field of a degree lookup table to at least obtain a degree of the node; determining whether the degree is greater than a predetermined value to obtain a determination result; and determining whether to perform lookup on a region of the cache corresponding to the type according to the determination result.

20 Claims, 7 Drawing Sheets

(56) References Cited

U.S. PATENT DOCUMENTS

| | | | |
|---|---|---|---|
| 2017/0336971 A1* | 11/2017 | Horn | G06F 12/0862 |
| 2019/0294643 A1* | 9/2019 | Shi | G06F 9/5016 |
| 2020/0104259 A1* | 4/2020 | Wang | G06F 12/0826 |
| 2022/0027281 A1* | 1/2022 | Uhrenholt | G06T 1/20 |

* cited by examiner

CACHE ACCESS METHOD AND ASSOCIATED GRAPH NEURAL NETWORK SYSTEM

CROSS-REFERENCE TO RELATED APPLICATIONS

This application claims priority to China Application Serial Number 202111373408.X, filed on Nov. 19, 2021, which is incorporated by reference in its entirety.

TECHNICAL FIELD

The present application relates to a cache, particularly to a cache access method and a related graph neural network system.

BACKGROUND

When training a graph neural network (GNN), the access process to the GNN is very discrete and random. Therefore, it is not possible to achieve high efficiency in the graph neural network system by using the general cache access method, and as a result, the overall training and inference time increases significantly. Therefore, how to plan the cache in graphical neural network system and optimize the access method has become one of the most important issues in the related field.

SUMMARY OF THE INVENTION

One purpose of the present disclosure is to provide a cache access method and a related graph neural network system to address the above-mentioned issues.

One embodiment of the present disclosure discloses a cache access method, the cache is configured to reduce an average time that a graph neural network processor accesses a memory. The graph neural network processor is configured to perform computation on a graph neural network, in which the graph neural network is stored in the memory in a compressed sparse row format, and the method includes: receiving an address corresponding to a node of the graph neural network and the type of the address; in response to the type is one of a first type and a second type, performing lookup by comparing the address with a tag field of a degree lookup table to at least obtain a degree of the node, wherein the degree is the number of edges of the node; determining whether the degree is greater than a predetermined value and obtaining a determination result; and determining whether to perform lookup on a region of the cache corresponding to the type based on the determination result, wherein the cache comprises at least a first region and a second region, wherein the first region corresponds to the first type, the second region corresponds to the second type, the first region is configured to store information associated with the edge, and the second region is configured to store information associated with an attribute.

One embodiment of the present disclosure discloses a graph neural network system, including: a graph neural network processor configured to perform computation on a graph neural network, wherein the graph neural network is stored in the memory in a compressed sparse row (CSR) format; a degree lookup table; a cache configured to reduce an average time that a graph neural network processor access a memory, the cache includes at least a first region and a second region, wherein the first region corresponds to a first type, the second region corresponds to a second type, the first region is configured to store information associated with an edge, and the second region is configured to store information associated with an attribute; and the memory; wherein the graph neural network processor performs following steps when performing computation on the graph neural network: receiving an address corresponding to a node of the graph neural network and a type of the address; in response to the type is one of the first type and the second type, performing lookup by comparing the address with a tag field of the degree lookup table to at least obtain a degree of the node, wherein the degree is the number of edges of the node; determining whether the degree is greater than a predetermined value and obtaining a determination result; and according to the determination result, determining whether to perform lookup on a region of the cache corresponding to the type; wherein the first type indicates that it is intended to retrieve information associated with the edge of the node, and the second type indicates that it is intended to retrieve information associated with the attribute of the node.

The cache access method and the related graph neural network system disclosed in the present disclosure can improve the access efficiency of the cache in the graph neural network system, thereby reducing the overall training time.

DETAILED DESCRIPTION

Figure 1:
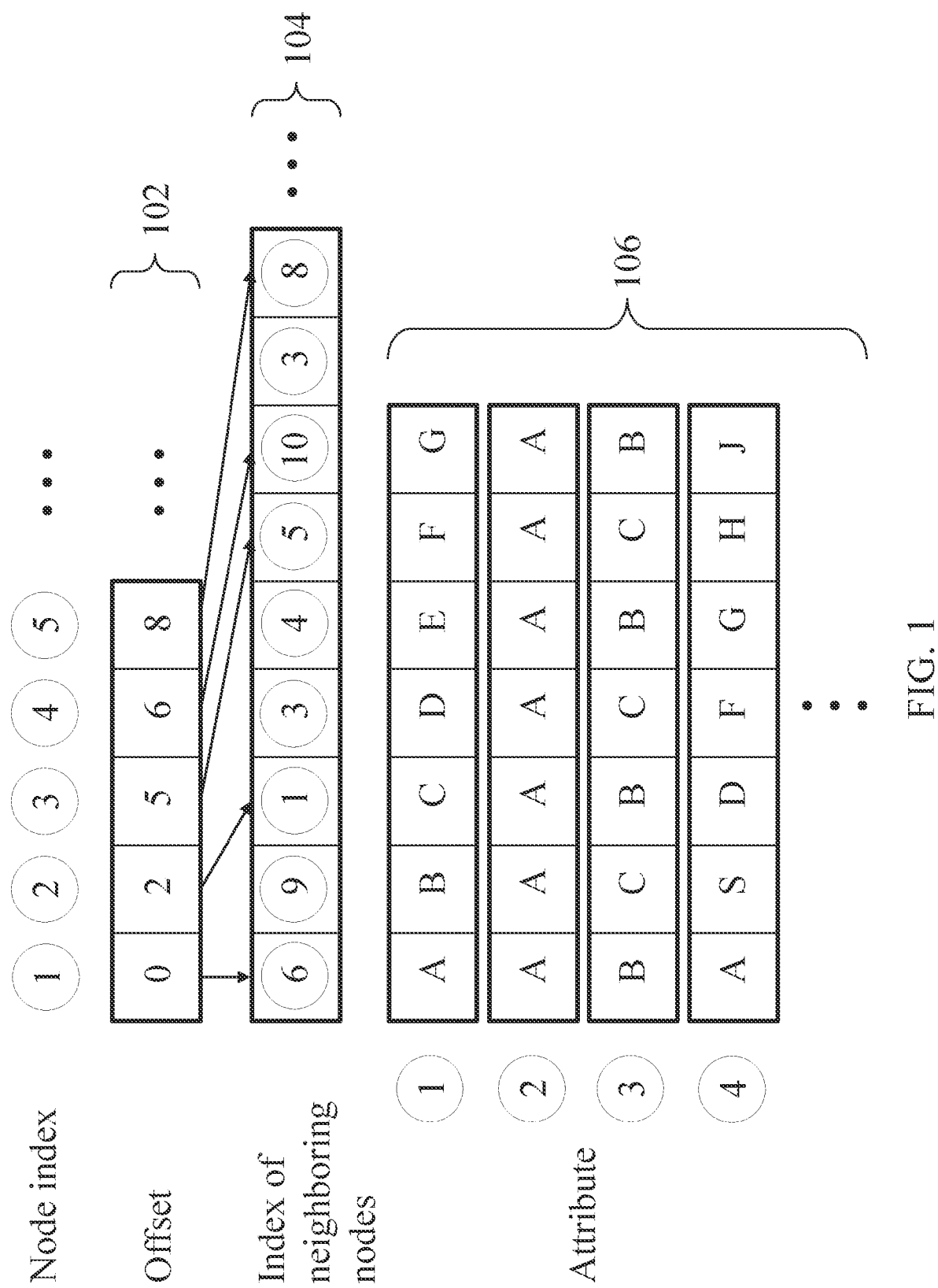
FIG. 1 is a schematic diagram illustrating a graph neural network stored in a memory in a compressed sparse row (CSR) format.

The following disclosure provides many different embodiments or examples for implementing different features of the present disclosure. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact and may also include embodiments in which additional features may be formed between the first and second features, such that the first and second features may not be in direct contact. In addition, the present disclosure may repeat reference numerals and/or letters in the various embodiments. This repetition is for the purpose of simplicity and clarity and does not in itself dictate a relationship between the various embodiments and/or configurations discussed.

Further, spatially relative terms, such as "beneath," "below," "lower," "above," "upper," and the like, may be used herein for ease of description to discuss one element or feature's relationship to another element(s) or feature(s) as illustrated in the drawings. These spatially relative terms are intended to encompass different orientations of the device in use or operation in addition to the orientation depicted in the drawings. The apparatus may be otherwise oriented (e.g., rotated by 90 degrees or at other orientations), and the spatially relative descriptors used herein may likewise be interpreted accordingly.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in the respective testing measurements. Also, as used herein, the term "the same" generally means within 10%, 5%, 1%, or 0.5% of a given value or range. Alternatively, the term "the same" means within an acceptable standard error of the mean when considered by one of ordinary skill in the art. As could be appreciated, other than in the operating/working examples, or unless otherwise expressly specified, all of the numerical ranges, amounts, values, and percentages (such as those for quantities of materials, duration of times, temperatures, operating conditions, portions of amounts, and the likes) disclosed herein should be understood as modified in all instances by the term "the same." Accordingly, unless indicated to the contrary, the numerical parameters set forth in the present disclosure and attached claims are approximations that can vary as desired. At the very least, each numerical parameter should at least be construed in light of the number of reported significant digits and by applying ordinary rounding techniques. Here, ranges can be expressed herein as from one endpoint to another endpoint or between two endpoints. All ranges disclosed herein are inclusive of the endpoints, unless specified otherwise.

FIG. 1 is a schematic diagram illustrating a graph neural network (GNN) stored in a memory in a compressed sparse row (CSR) format. The graph neural network may include a plurality of nodes, each node determines its respective neighboring nodes based on corresponding information of "edge". Further, each node has "attribute" information. To obtain the complete data of the graph neural network in the memory, one must first establish a method for obtaining the complete data concerning any node in the graph neural network and all its first-order neighboring node in the memory, and use it as the basis to obtain the complete data of the graph neural network. Given that the data is stored in the compressed sparse row format, the above-mentioned basic method is divided into three steps.

In the first step, it is first determined which node is to be retrieved based on the need; i.e., the "index" of the desired node (hereinafter, the root node) is first obtained. Based on the "index", the value of the "offset" corresponding to said "index" and the value of the next "offset" immediately following it can be obtained in the field 102. Then, in the second step, based on the "offset" of said "index", a starting position can be obtained in the field 104, wherein the starting position is configured to indicate the starting position of the information of the "edge" of the root node in the field 104. In other words, the value stored in the field 102 points to a specific position in the field 104. Specifically, in the field 102, the "index" information of all the neighboring nodes of the root node is stored consecutively from the starting position.

In the case where the number of neighboring nodes is not known, the next starting position is indicated based on the value of the next "offset" based on the principles of the compressed sparse row format. In this way, it is able to ascertain that all the data before the next starting position is the "index" information of the neighboring nodes of the root node. Finally, in the third step, based on the "index" information of all neighboring nodes in the field 104, the "attribute" of each neighboring node can be obtained correspondingly in the field 106.

For example, to obtain the "attribute" of all the neighboring nodes of the node with an "index" of ② in FIG. 1 (i.e., the node ② is the root node), we first obtain the "offset" of the node ② as 2 by referring to the field 102. The next "offset" that is consecutively stored in the field 102 after the "offset" 2 is 5, so we can know that the "edge" of the node ② is stored in the field 104 starting from the position 2, and it is not an "edge" of the node ② starting from the position 5. Therefore, the position 2 to the position (5-1) is the information of "edge" of the node ②, which includes all the "edges" of the node ② that is, the "index" of all the neighboring nodes of the node ② (i.e., the node ①, the node ③ and the node ④). In the field 106, we can obtain the "attribute" "ABCDEFG" of the node ①, "attribute" "BCBCBCBCB" of the node ③, and "attribute" "ASDFGHJ" of the node ④.

The present disclosure has obtained a generalized conclusion after observing the graph neural network and a lot of practice. That is, in a graph neural network, the greater the number of "edges" of a node (that is, the number of first-order neighboring nodes, also known as "degree"), the higher the probability of this node being visited. Based on this principle, the present disclosure optimizes the cache planning and access method in the graph neural network system, and the details will be described below.

Figure 2:
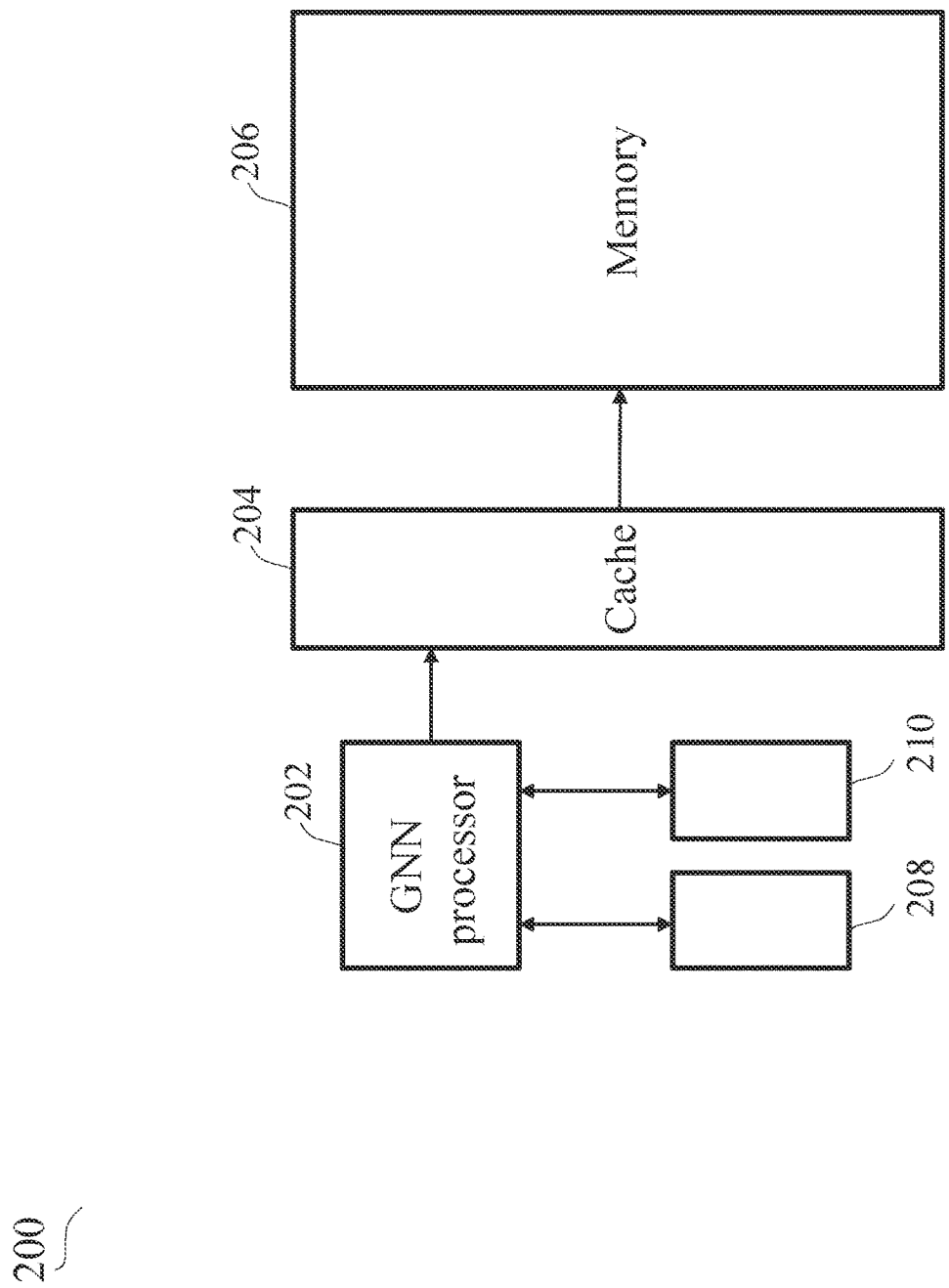
FIG. 2 is a schematic diagram illustrating a graph neural network system according to embodiments of the present disclosure.

FIG. 2 is a schematic diagram illustrating a graph neural network system according to embodiments of the present disclosure. The graph neural network system 200 includes a graph neural network processor 202, a cache 204, a memory 206, a degree lookup table 208 and a region lookup table 210. The graph neural network processor 202 is configured to perform computation upon the graph neural network. The cache 204 is configured to reduce an average time that the graph neural network processor 202 accesses the memory 206.

Figure 3:
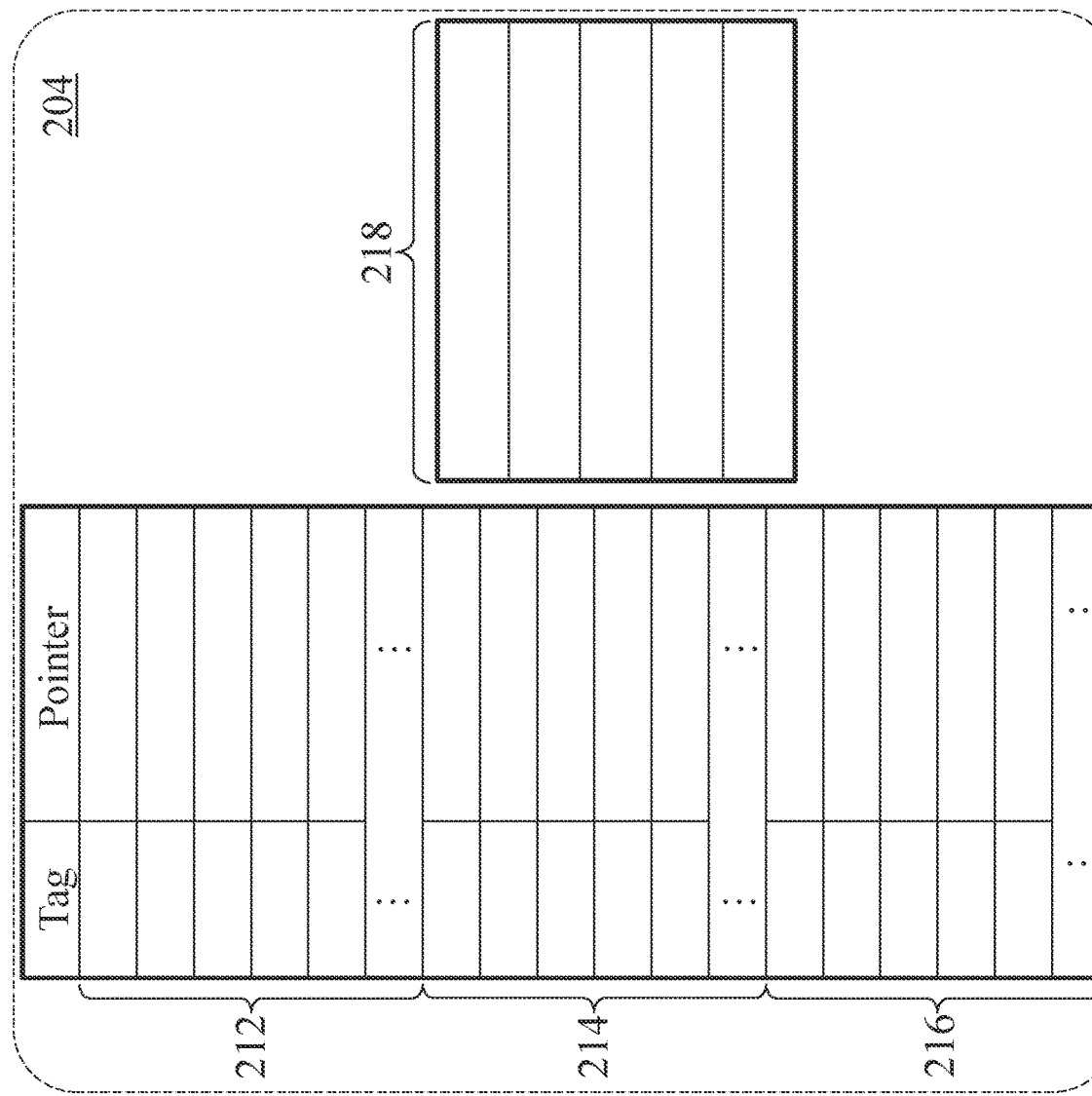
FIG. 3 is a schematic diagram illustrating a degree lookup table, a region lookup table and a cache of the graph neural network system according to embodiments of the present disclosure.
Figure 3:
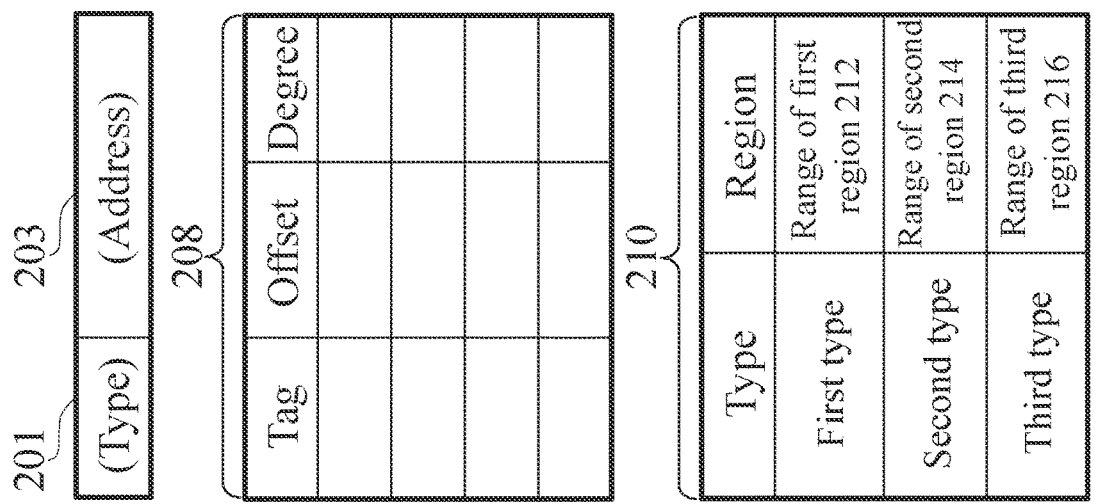

FIG. 3 is a schematic diagram illustrating the degree lookup table 208, the region lookup table 210 and the cache 204 of the graph neural network system 200 according to embodiments of the present disclosure. The cache 204 is discussed first. The cache 204 includes a first region 212, a second region 214, a third region 216 and a data array 218. The range of each region may be determined by the graph neural network processor 202 or the upper-layer software, and the range of each region does not overlap with each other. The first region 212, the second region 214 and the third region 216 all include a "tag" field and an "pointer" field, wherein the "tag" field is for comparison when performing lookup, and the "pointer" is configured to point to a specific range of the location in the data array 218.

The degree lookup table 208 includes a "tag" field, an "offset" field and a "degree" field. The "tag" field is for comparison when performing lookup, and specifically, the value of the tag corresponds to the node. The "offset" is associated with the starting position of the "edge" of the node of the corresponding tag in the memory 206. The "degree" is the number of the "edge" of the node of the corresponding tag. In the present embodiment, the elimination strategy of the degree lookup table 208 is a combination of the Least Recently Used (LRU) with the value of "degree," for example, the less recently used and the smaller the degree, the sooner it gets removed.

The region lookup table 210 includes a "type" field and a "region" field. In the present embodiment, the "type" field includes three different "types." That is, a first type, a second type and a third type. The "region" field in the region lookup table 210 stores the specific range of each region in the cache 204. The first type corresponds to a "region" being the first region 212 in the cache 204, the second type corresponds to a "region" being the second region 214 in the cache 204, and the third type corresponds to a "region" being the third region 216 in the cache 204. In this case, the first region 212 is configured to store information associated with the "edge," the second region 214 is configured to store information associated with the "attribute," and the third region 216 is configured to store information associated with the "edge" coalesce. As explained above regarding the compressed sparse row format, since the information of "edge" is stored consecutively in the memory, the third region 216 will store the pointer of information of "edge" that are read from the memory 206 due to spatial locality.

In the present embodiment, the elimination strategy of the first region 212 and the second region 214 is the least recently used. The elimination strategy of the third region 216 is eliminated after use, for example, after nodes included in the information of all "edges" in a certain cache line have been accessed, the data in this cache line is deleted.

When the neural network processor 202 intends to obtain data, it will issue a request, which includes information 201 and information 203, where the information 201 includes the information of the "type," and the information 203 includes the information of the "address." In the present embodiment, the "type" information is used to perform lookup in "type" field in the region lookup table 210. In response to the "type" is the first type, it means that it is intended to obtain the "edge" of the node corresponding to the "address." In response to the "type" is the second type, it means that it is intended to obtain the "attribute" of the node corresponding to the "address." In response to the "type" is the third type, the details will be described later.

Figure 4:
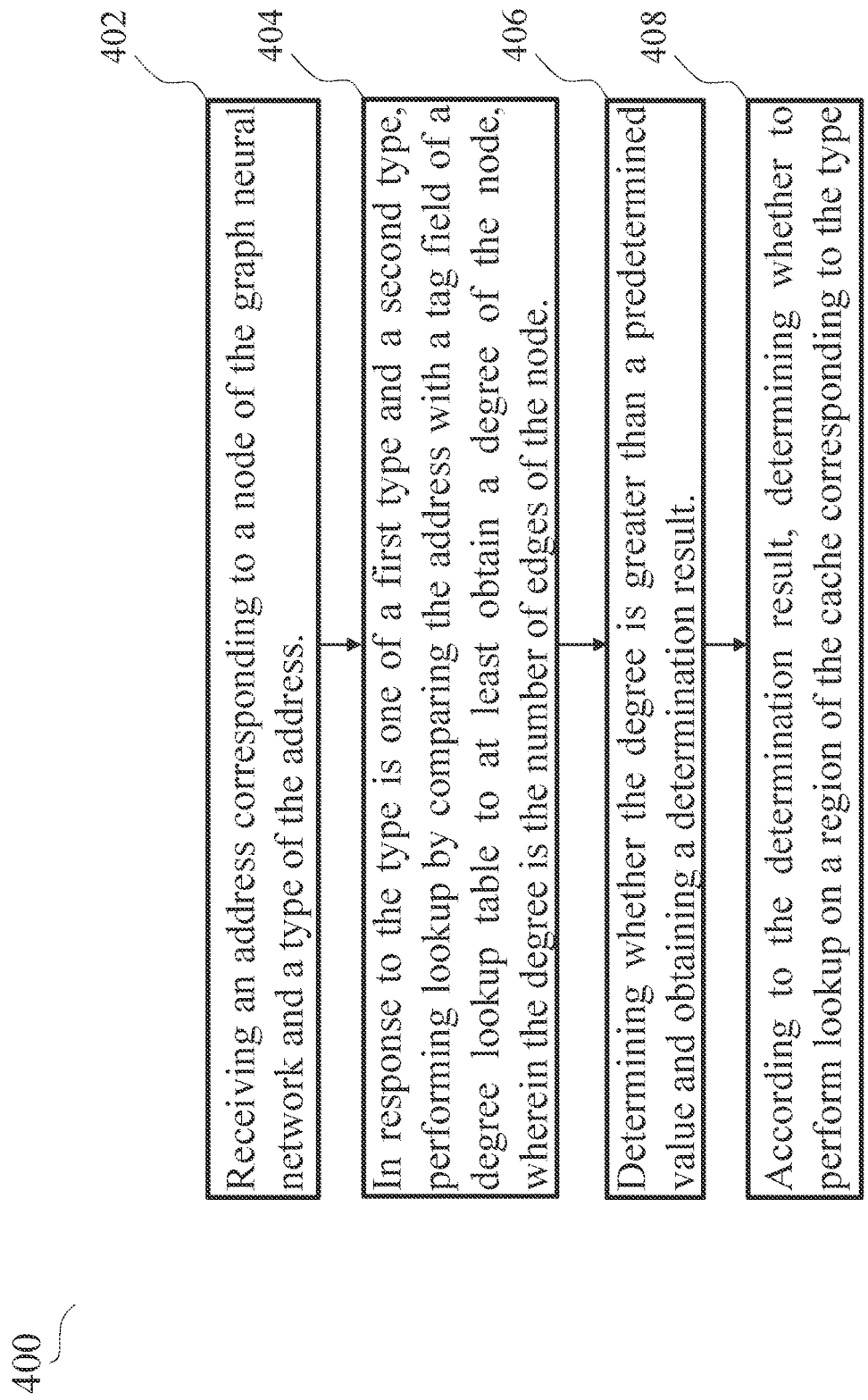
FIG. 4 is a flowchart illustrating a cache access method according to embodiments of the present disclosure.

FIG. 4 is a flowchart illustrating a cache access method according to embodiments of the present disclosure. In the method 400, first in step 402, the "address" (i.e., information 203) corresponding to a root node in the graph neural network and the "type" of the "address" (i.e., information 201) are received from the graph neural network processor 202.

Next, in the Step 404, the subsequent operation is determined according to the "type." Generally speaking, In response to the "type" is one of the first type and the second type, the lookup is performed based on the "tag" field in the "address" degree lookup table 208, so as to obtain at least the "degree" of the root node. The spirit of the present disclosure is that in the Step 406, whether the "degree" is greater than a predetermined value, thereby obtaining a determination result. In other words, if the "degree" is greater than the predetermined value, it means that the root node is more likely to be accessed. Therefore, according to the elimination strategy of the first region 212 and the second region 214, the probability that related data of the root node is stored in the first region 212 and the second region 214 is relatively high. If the "degree" is not greater than the predetermined value, the probability that the related data of the root node is stored in the first region 212 and the second region 214 is low. Therefore, based on this principle, in the Step 408, it can be determined whether to perform lookup in the "region" corresponding to the "type" in the cache 204 based on the determination result. For example, if it is determined that the probability that the related data of the root node is stored in the "region" corresponding to the "type" in the cache 204 is not high, a more efficient result may be obtained by directly accessing the memory 206.

Figure 5:
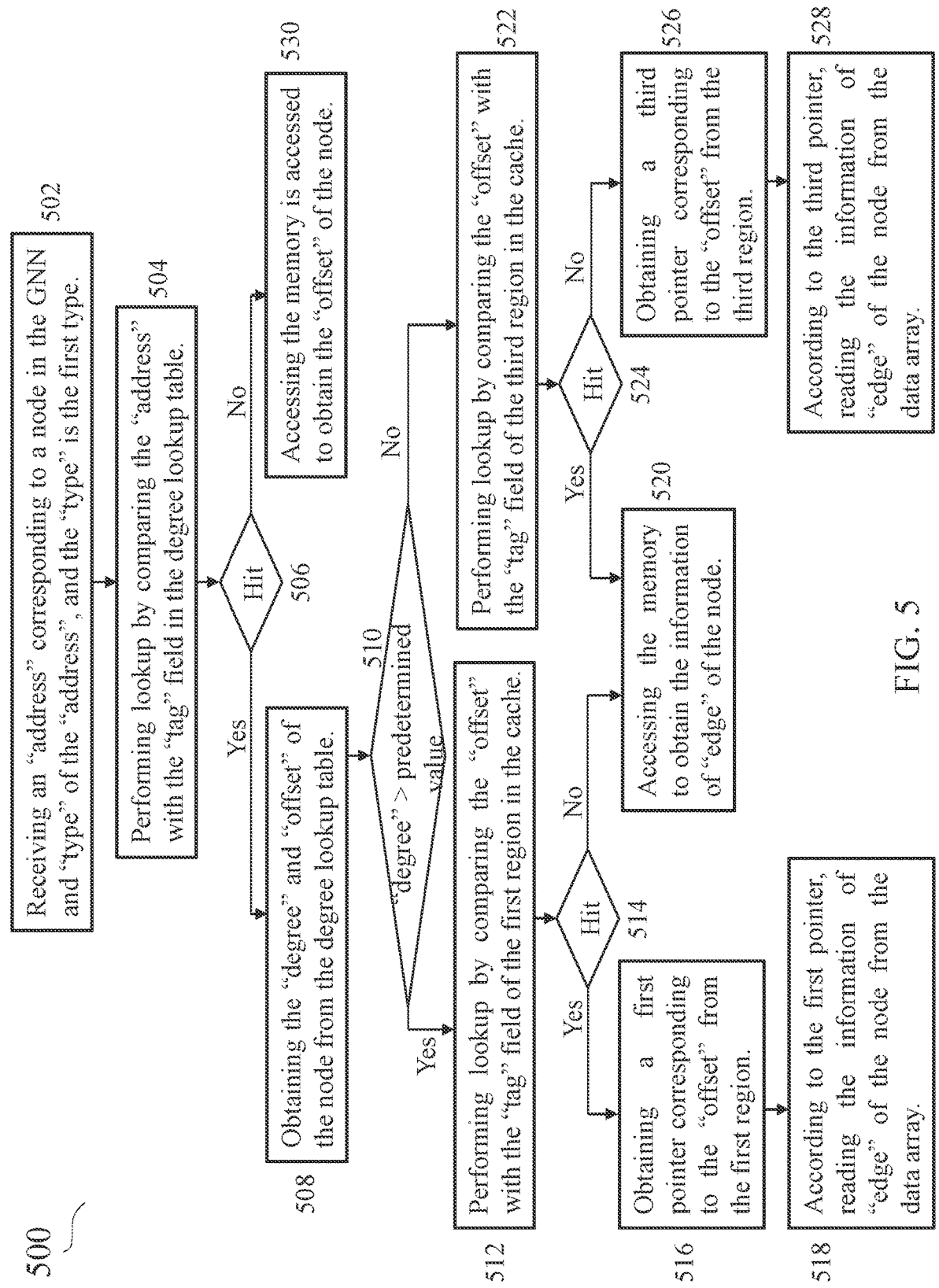
FIG. 5 is a flowchart illustrating a cache access method for the case that the type is a first type according to embodiments of the present disclosure.
Figure 6:
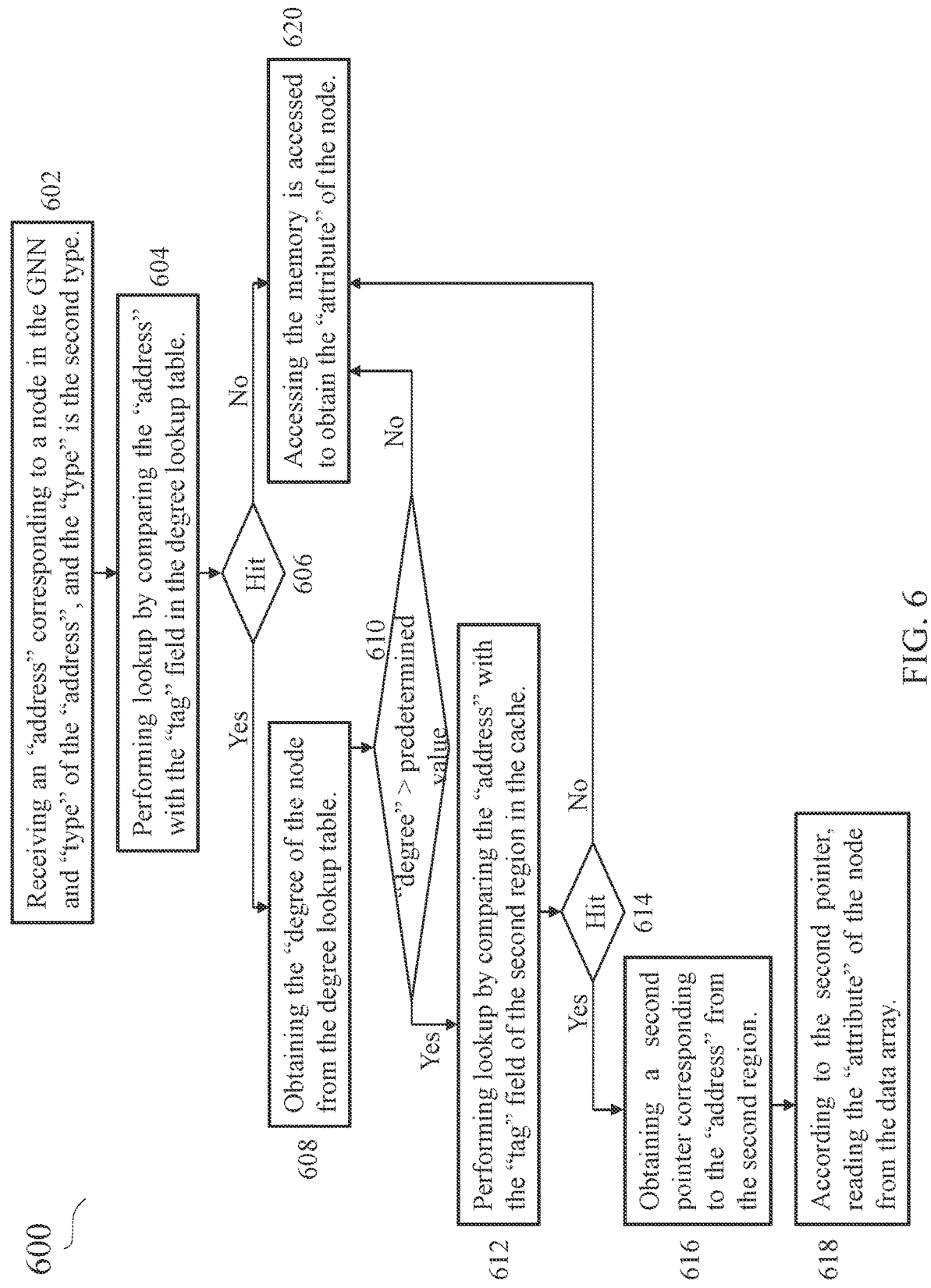
FIG. 6 is a flowchart illustrating a cache access method for the case that the type is a second type according to embodiments of the present disclosure.
Figure 7:
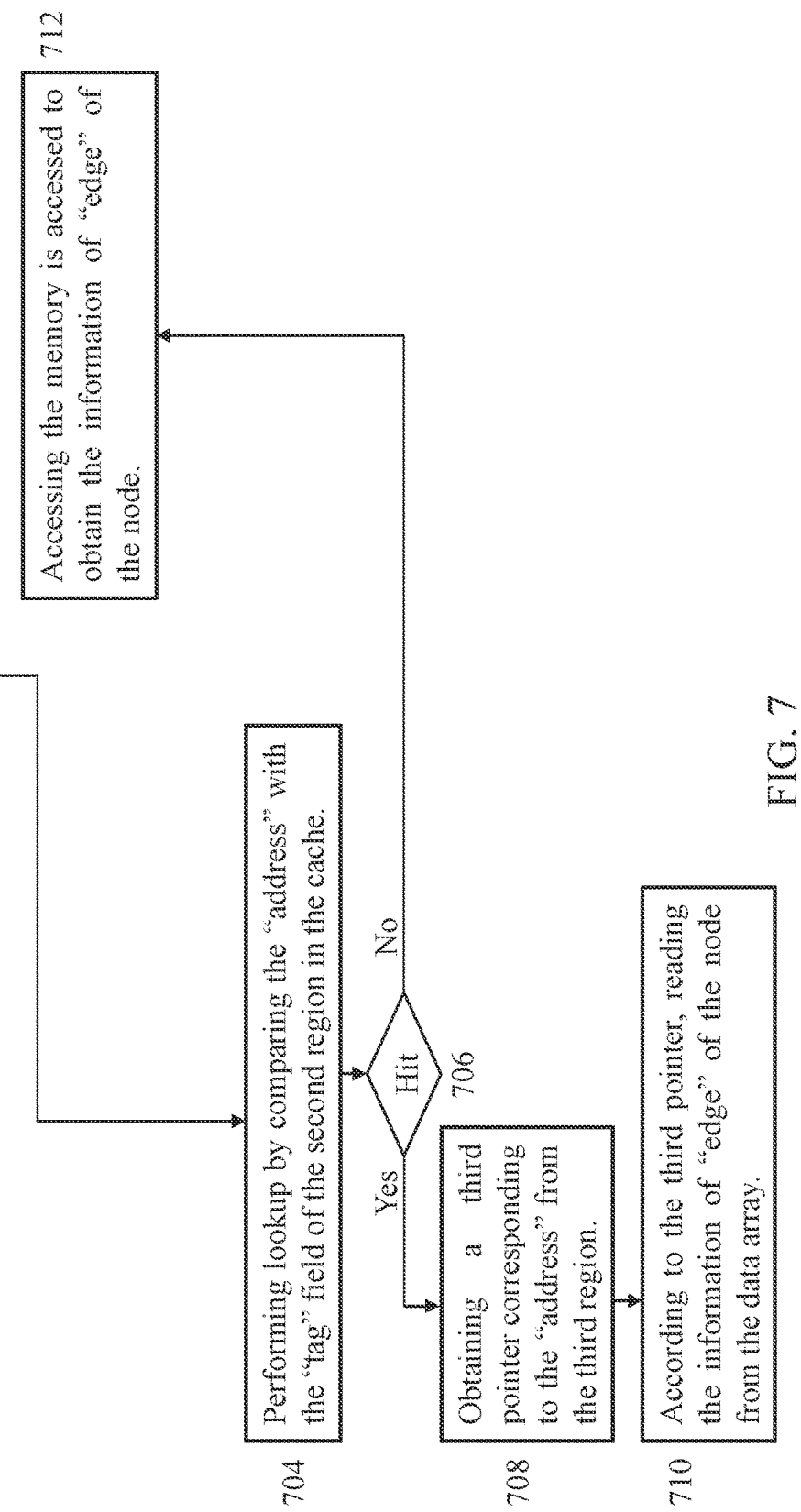
FIG. 7 is a flowchart illustrating a cache access method for the case that the type is a third type according to embodiments of the present disclosure.

FIG. 5 to FIG. 7 separately illustrate the situations where the "type" is the first type, the second type and the third type. FIG. 5 illustrates a flowchart 500 of specific embodiments wherein the type is the first type.

First, in the Step 502, an "address" (i.e., information 203) corresponding to a root node in the graph neural network and "type" (i.e., information 201) of the "address" are received from the graph neural network processor 202, wherein the "type" is the first type, which indicates that the graph neural network processor 202 intends to obtain the information of "edge" of the root node; that is, to obtain "indexes" of all the first-order neighboring nodes of the root node.

In the Step 504, lookup is performed by comparing the "address" with the "tag" field in the degree lookup table 208.

In the Step 506, a result of performing lookup on the lookup table 208 is obtained, and if the degree lookup table 208 hit happens, then proceeds to the Step 508.

In the Step 508, the "degree" and "offset" of the root node is obtained from the degree lookup table 208.

In the Step 510, whether the "degree" is greater than a predetermined value is determined. If yes, then proceeds to the Step 512.

In the Step 512, lookup is performed by comparing the "offset" with the "tag" field of the first region 212 in the cache 204. In certain embodiments, before performing lookup on the first region 212, the region lookup table 210 is first used to determine a specific range of the first region 212 in the cache 204.

In the Step 514. a result of performing lookup on the first region 212 is obtained, and if the first region 212 hit happens, then proceeds to the Step 516.

In the Step 516, a first pointer corresponding to the "offset" is obtained from the "pointer" field of the first region 212.

In the Step 518, the information of "edge" of the root node is read from the data array 218 based on the first pointer.

Returning to the step 514, if the first region 212 miss happens, then proceeds to the Step 520.

In the Step 520, the memory 206 is accessed to obtain the information of "edge" of the root node.

Returning to the step 510, if it is determined that the "degree" is no greater than the predetermined value, then proceeds to the Step 522.

In the Step 522, lookup is performed by comparing the "offset" with the "tag" field of the third region 216 in the cache 204. In certain embodiments, before performing lookup on the third region 216, the region lookup table 210 is first used to determine a specific range of the third region 216 in the cache 204.

In the Step 524, a result of performing lookup on the third region 216 is obtained, if the third region 216 hit happens, then proceeds to the Step 526.

In the Step 526, a third pointer corresponding to the "offset" is obtained from the "pointer" field of the third region 216.

In the Step 528, the information of "edge" of the root node is read from the data array 218 based on the third pointer.

Returning to the step 524, if the third region 216 miss happens, then proceeds to the Step 520.

Returning to the step 506, if the degree lookup table 208 miss happens, then proceeds to the Step 530.

In the Step 530, the memory 206 is accessed to obtain the "offset" if the root node.

After obtaining the "indexes" of all the first-order neighboring nodes of the root node, the graph neural network processor 202 may further obtain an "attribute" of each first-order neighboring node. Therefore, the embodiment of FIG. 6 is used. FIG. 6 illustrates a flowchart 600 of specific embodiments wherein the type is the second type.

First, in the Step 602, an "address" (i.e., information 203) corresponding to a root node and "type" (i.e., information 201) of the "address" in the graph neural network are received from the graph neural network processor 202 receive, wherein the "type" is the second type, which indicates that the graph neural network processor 202 intends to obtain the "attribute" of the root node.

In the Step 604 lookup is performed by comparing the "address" with the "tag" field in the degree lookup table 208.

In the Step 606, a result of performing lookup on the lookup table 208 is obtained, and if the degree lookup table 208 hit happens, then proceeds to the Step 608.

In the Step 608, the "degree" of the root node is obtained from the degree lookup table 208.

In the Step 610, whether the "degree" is greater than a predetermined value is determined. If yes, then proceeds to the Step 612.

In the Step 612, lookup is performed by comparing the "offset" with the "tag" field of the second region 214 in the cache 204. In certain embodiments, before performing lookup on the third region 216, the region lookup table 210 is first used to determine a specific range of the second region 214 in the cache 204.

In the Step 614, a result of performing lookup on the second region 214 is obtained, and if the second region 214 hit happens, then proceeds to the Step 516.

In the Step 616, a second pointer corresponding to the "address" is obtained from the "pointer" field of the second region 214.

In the Step 618, the "attribute" of the root node is read from the data array 218 based on the second pointer.

Returning to the step 614, if the second region 214 miss happens, then proceeds to the Step 620.

In the Step 620, the memory 206 is accessed to obtain the "attribute" of the root node.

Returning to the step 610, if determining the "degree" is no greater than the predetermined value, then proceeds to the Step 620.

Returning to the step 606, if the degree lookup table 208 miss happens, then proceeds to the Step 620.

Referring again to FIG. 5, if the degree lookup table 208 miss happens, then the method proceeds to the step 530 wherein the memory 206 is directly accessed to obtain the "offset" of the root node. The graph neural network processor 202 needs additional processes to obtain the information of "edge" of the root node; i.e., to obtain the "indexes" of all first-order neighboring node of the root node. Therefore, the embodiment of FIG. 7 is used. FIG. 7 illustrate a flowchart 700 of specific embodiments wherein the type is the third type.

First, in the Step 702, an "address" (i.e., information 203) corresponding to a root node and "type" (i.e., information 201) of the "address" in the graph neural network are received from the graph neural network processor 202 receive, wherein the "type" is the third type, which indicates that the graph neural network processor 202 already owns the "offset" of the root node and intends to obtain the information of "edge" of the root node based on the "offset.". In this case, the content of the "address" is the "offset" of the root node.

In the Step 704, lookup is performed by comparing the "address" with the "tag" field in the third region 216 of the degree lookup table 208.

In the Step 706, a result of performing lookup on the third region 216 is obtained, and if the third region 216 hit happens, then proceeds to the Step 608.

In the Step 708, the third index corresponding to the "address" is obtained from the "index" field of the third region 216. In certain embodiments, before performing lookup on the third region 216 perform, the region lookup table 210 is first used to determine the specific range of the third region 216 in the cache 204.

In the Step 710, the information of "edge" of the root node is read from the data array 218 based on the third index.

Returning to the step 706, if the third region 216 miss happens, then proceeds to the Step 712.

In the Step 712, the memory 206 is accessed to obtain the information of "edge" of the root node.

It should be noted that the degree lookup table 208 and the region lookup table 210 of the present disclosure are disposed in a memory or cache other than the cache 204. In addition, the cache 204 is configured in as a fully associative cache in embodiments of the present disclosure, but the present disclosure is not limited thereto.

The cache access method 400/500/600/700 and the associated graph neural network system 200 of the present disclosure can improve the efficiency of accessing cache 204 in the graph neural network system 200, and thus reduce the overall training time.

The foregoing description briefly sets forth the features of certain embodiments of the present application so that persons having ordinary skill in the art more fully understand the various aspects of the disclosure of the present application. It will be apparent to those having ordinary skill in the art that they can easily use the disclosure of the present application as a basis for designing or modifying other processes and structures to achieve the same purposes and/or benefits as the embodiments herein, It should be understood by those having ordinary skill in the art that these equivalent implementations still fall within the spirit and scope of the disclosure of the present application and that they may be subject to various variations, substitutions, and alterations without departing from the spirit and scope of the present disclosure.

What is claimed is:

1. A cache access method, wherein the cache is configured to reduce an average time that a graph neural network processor accesses a memory, the graph neural network processor is configured to perform computation on a graph neural network, wherein the graph neural network is stored in the memory in a compressed sparse row (CSR) format, and the method comprises:
receiving an address corresponding to a node of the graph neural network and a type of the address;
in response to the type is one of a first type and a second type, performing lookup by comparing the address with a tag field of a degree lookup table to at least obtain a degree of the node, wherein the degree is the number of edges of the node;
determining whether the degree is greater than a predetermined value and obtaining a determination result; and according to the determination result, determining whether to perform lookup on a region of the cache corresponding to the type, wherein the cache comprises at least a first region and a second region, wherein the first region corresponds to the first type, the second region corresponds to the second type, the first region is configured to store information associated with the edge, and the second region is configured to store information associated with an attribute, wherein the first type indicates that it is intended to retrieve information associated with the edge of the node, and the second type indicates that it is intended to retrieve information associated with the attribute of the node.

2. The method of claim 1, wherein in response to the type is the first type, and the step of performing lookup by comparing the address with the tag field of the degree lookup table to obtain the degree of the node comprises:
in response to the degree lookup table hit occurring, obtaining the degree and an offset of the node from the degree lookup table, wherein the offset is associated with a starting position of the edge of the node in the memory.

3. The method of claim 2, wherein the step of according to the determination result, determining whether to perform lookup on the region of the cache corresponding to the type comprises:
in response to the determination result indicates that the degree corresponding to the address is greater than the predetermined value, performing lookup by comparing the offset with a tag field in the first region in the cache.

4. The method of claim 3, further comprising:
in response to the first region hit occurring, obtaining a first pointer corresponding to the offset from the first region, wherein the first pointer is configured to point to a location storing information of the edge of the node in a data array of the cache; and
reading the information of the edge of the node from the data array based on the first pointer.

5. The method of claim 3, further comprising:
in response to the first region miss occurring, accessing the memory to obtain the information of the edge of the node.

6. The method of claim 2, wherein the cache further comprises a third region, the third region is configured to store information associated with edge coalesce, and the step of according to the determination result, determining whether to perform lookup on the region of the cache corresponding to the type comprises:
in response to the determination result indicates that the degree corresponding to the address is not greater than the predetermined value, performing lookup by comparing the offset with the tag field in the third region in the cache; and
the method further comprises:
in response to the third region hit occurring, obtaining a third pointer corresponding to the offset from the third region, wherein the third pointer is configured to point to a location storing the information of the edge of the node in the data array of the cache; and
reading the information of the edge of the node from the data array based on the third pointer.

7. The method of claim 6, further comprising:
in response to the third region miss occurring, accessing the memory to obtain the information of the edge of the node.

8. The method of claim 1, wherein the type is the first type, and the method further comprises:
in response to the degree lookup table miss occurring, accessing the memory to obtain an offset of the node, wherein the offset is associated with a starting position of the edge of the node in the memory.

9. The method of claim 1, wherein the type is the second type, and the step of performing lookup by comparing the address with the tag field of the degree lookup table to obtain the degree of the node comprises:
in response to the degree lookup table hit occurring, obtaining the degree of the node from the degree lookup table.

10. The method of claim 9, wherein the step of according to the determination result, determining whether to perform lookup on the region of the cache corresponding to the type comprises:
in response to the determination result indicates that the degree corresponding to the address is greater than the predetermined value, performing lookup on the cache by comparing the address with a tag field in the second region; and
the method further comprises:
in response to the second region hit occurring, obtaining a second pointer corresponding to the address from the second region, wherein the second pointer is configured to point to a location storing the attribute of the node in a data array of the cache, store, and reading the attribute of the node from the data array based on the second pointer; and
in response to the second region miss occurring or when the determination result indicates that the degree corresponding to the address is not greater than the predetermined value, accessing the memory to obtain the attribute of the node.

11. The method of claim 1, wherein in response to the type is the second type, and the method further comprises:
in response to the degree lookup table miss occurring, accessing the memory to obtain the attribute of the node.

12. The method of claim 1, wherein the cache further comprises a third region, wherein the third region is configured to store information associated with edge coalesce, and the method further comprises:
in response to the type is the third type, the address is the offset of the node, and it is intended to retrieve information associated with the edge of the node, wherein the offset is associated with a starting position of the edge of the node in the memory;
performing lookup on the cache by comparing the address with the tag field in the third region;
in response to the third region hit occurring, obtaining a third pointer corresponding to the address from the third region, wherein the third pointer is configured to point to a location storing the information of the edge of the node in the data array of the cache, and reading the information of the edge of the node from the data array based on the third pointer; and
in response to the third region miss occurring, accessing the memory to obtain the information of the edge of the node.

13. A graph neural network system, comprising:
a graph neural network processor, configured to perform computation on a graph neural network, wherein the graph neural network is stored in a memory in a compressed sparse row (CSR) format;
a degree lookup table;
a cache, configured to reduce an average time that a graph neural network processor access the memory, the cache comprises at least a first region and a second region, wherein the first region corresponds to a first type, the second region corresponds to a second type, the first region is configured to store information associated with an edge, and the second region is configured to store information associated with an attribute, wherein the graph neural network processor performs following steps when performing computation on the graph neural network:
- receiving an address corresponding to a node of the graph neural network and a type of the address;
- in response to the type is one of the first type and the second type, performing lookup by comparing the address with a tag field of the degree lookup table to at least obtain a degree of the node, wherein the degree is the number of edges of the node;
- determining whether the degree is greater than a predetermined value and obtaining a determination result; and
- according to the determination result, determining whether to perform lookup on a region of the cache corresponding to the type, wherein the first type indicates that it is intended to retrieve information associated with the edge of the node, and the second type indicates that it is intended to retrieve information associated with the attribute of the node.

14. The graph neural network system of claim 13, wherein in response to the degree lookup table hit occurring, the graph neural network processor obtains the degree and an offset of the node from the degree lookup table, wherein the offset is associated with a starting position of the edge of the node in the memory.

15. The graph neural network system of claim 14, wherein in response to the determination result indicates that the degree corresponding to the address is greater than the predetermined value, the graph neural network processor performs lookup by comparing the offset with a tag field in the first region in the cache.

16. The graph neural network system of claim 15, wherein:
- in response to the first region hit occurring, the graph neural network processor obtains a first pointer corresponding to the offset from the first region, wherein the first pointer is configured to point to a location storing information of the edge of the node in a data array of the cache; and
- the graph neural network processor reads the information of the edge of the node from the data array based on the first pointer; and in response to the first region miss occurring, the graph neural network processor accesses the memory to obtain the information of the edge of the node.

17. The graph neural network system of claim 14, wherein the cache further comprises a third region, wherein the third region is configured to store information associated with edge coalesce.

18. The graph neural network system of claim 17, wherein in response to the determination result indicates that the degree corresponding to the address is not greater than the predetermined value, the graph neural network processor performs lookup by comparing the offset with the tag field in the third region in the cache, wherein response to the third region hit occurring, the graph neural network processor obtains a third pointer corresponding to the offset from the third region, wherein the third pointer is configured to point to a location storing the information of the edge of the node in the data array of the cache;
- the graph neural network processor reads the information of the edge of the node from the data array based on the third pointer; and
- in response to the third region miss occurring, the graph neural network processor accesses the memory to obtain the information of the edge of the node.

19. The graph neural network system of claim 17, wherein in response to the type is the third type, the address is the offset of the node, and it is intended to retrieve information associated with the edge of the node, wherein the offset is associated with a starting position of the edge of the node in the memory, and the graph neural network processor performs lookup on the cache by comparing the address with the tag field in the third region, wherein in response to the third region hit occurring, the graph neural network processor obtains a third pointer corresponding to the address from the third region, wherein the third pointer is configured to point to a location storing the information of the edge of the node in the data array of the cache, and reading the information of the edge of the node from the data array based on the third pointer; and
- in response to the third region miss occurring, the graph neural network processor accesses the memory to obtain the information of the edge of the node.

20. The graph neural network system of claim 17, further comprising a region lookup table, including a type field and a region field, wherein the type field includes the first type, the second type and the third type, and the region field includes a range of the first region in the cache, a range of the second region in the cache and a range of the third region in the cache, wherein the graph neural network processor obtains the first region corresponding to the first type, the second region corresponding to the second type and the third region corresponding to the third type based on the region lookup table.

* * * * *